(12) United States Patent
Lu et al.

(10) Patent No.: US 11,652,781 B2
(45) Date of Patent: May 16, 2023

(54) DATA PROCESSING METHOD BASED ON MEC PLATFORM, DEVICE, AND STORAGE MEDIUM

(71) Applicant: Lenovo (Beijing) Co., Ltd., Beijing (CN)

(72) Inventors: Yan Lu, Beijing (CN); Liangliang Ma, Beijing (CN); Min Ji, Beijing (CN); Feiyu Zeng, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 104 days.

(21) Appl. No.: 17/192,850

(22) Filed: Mar. 4, 2021

(65) Prior Publication Data
US 2021/0281538 A1 Sep. 9, 2021

(30) Foreign Application Priority Data
Mar. 9, 2020 (CN) .......................... 202010156592.1

(51) Int. Cl.
| | |
|---|---|
| *H04L 61/4511* | (2022.01) |
| *H04L 61/256* | (2022.01) |
| *H04L 69/22* | (2022.01) |
| *H04W 28/06* | (2009.01) |
| *H04W 48/18* | (2009.01) |
| *H04L 61/4552* | (2022.01) |

(52) U.S. Cl.
CPC ........ *H04L 61/4511* (2022.05); *H04L 61/256* (2013.01); *H04L 61/4552* (2022.05); *H04L 69/22* (2013.01); *H04W 28/06* (2013.01); *H04W 48/18* (2013.01)

(58) Field of Classification Search
CPC ....... H04L 45/50; H04L 61/256; H04L 69/22; H04L 2212/00; H04L 45/64; H04L 45/74; H04L 61/4511; H04L 61/4552; H04L 67/10; H04W 28/06; H04W 48/18
See application file for complete search history.

(56) References Cited

U.S. PATENT DOCUMENTS

| | | | | |
|---|---|---|---|---|
| 2018/0091410 | A1* | 3/2018 | Browne | .............. H04L 41/5009 |
| 2018/0352038 | A1* | 12/2018 | Sathyanarayana | ...... H04L 69/22 |

FOREIGN PATENT DOCUMENTS

| | | | |
|---|---|---|---|
| CN | 104717639 A | * | 6/2015 |
| CN | 107911258 A | | 4/2018 |
| CN | 110381131 A | | 10/2019 |

OTHER PUBLICATIONS

Xin Chen et al., "The Architecture Design of Cooperated Deployment for Multi-Access Edge Computing in 5G," Journal of Beijing University of Posts and Telecommunications, Oct. 2018, vol. 41 No. 5, pp. 86-91, 97. 7 pages.

* cited by examiner

*Primary Examiner* — Zhensheng Zhang
(74) *Attorney, Agent, or Firm* — Anova Law Group, PLLC (57) ABSTRACT

A data processing method based on a mobile edge computing (MEC) platform includes receiving a target data packet transmitted by a terminal, determining whether the target data packet includes a network service header (NSH) tag, and when determining that the target data packet includes the NSH tag, transmitting the target data packet to a target MEC platform corresponding to the NSH tag for data processing.

18 Claims, 5 Drawing Sheets

DATA PROCESSING METHOD BASED ON MEC PLATFORM, DEVICE, AND STORAGE MEDIUM

CROSS-REFERENCE TO RELATED APPLICATION

This application claims priority to Chinese Patent Application No. 202010156592.1, filed on Mar. 9, 2020, the entire content of which is incorporated herein by reference.

TECHNICAL FIELD

The present disclosure generally relates to the communication technology field and, more particularly, to a data processing method based on a mobile edge computing (MEC) platform, a device, and a storage medium.

BACKGROUND

Mobile edge computing (MEC) is structured based on 5-th generation (5G) technology, which is a technology that deeply integrates access networks and Internet services. MEC deploys a portion of service processing and resource scheduling functions of an application server (AS) and a mobile broadband (MBB) core network near a network edge of the access networks. By processing services close to users, MEC provides an excellent service experience that is reliable and has little time delay.

SUMMARY

Embodiments of the present disclosure provide a data processing method based on a mobile edge computing (MEC) platform. The method includes receiving a target data packet transmitted by a terminal, determining whether the target data packet includes a network service header (NSH) tag, and in response to determining that the target data packet includes the NSH tag, transmitting the target data packet to a target MEC platform corresponding to the NSH tag for data processing.

Embodiments of the present disclosure provide a data processing method. The method includes encapsulating an NSH tag for a target data packet according to a target condition and transmitting the target data packet having the NSH tag to a gateway for data processing.

Embodiments of the present disclosure provide a storage medium including a computer program. The computer program that, when executed by a processor, causes the processor to receive a target data packet transmitted by a terminal, determine whether the target data packet includes an NSH tag, and in response to determining that the target data packet includes the NSH tag, transmit the target data packet to a target MEC platform corresponding to the NSH tag for data processing.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Various solutions and features of the present disclosure are described in connection with the accompanying drawings.

Various modifications may be made to embodiments of the present disclosure.

Therefore, the specification should not be considered as a limitation but an example of embodiments of the present disclosure. Those skilled in the art may think of other modifications within the scope and spirit of the present disclosure.

The accompanying drawings included in the specification and composed of a portion of the specification show embodiments of the present disclosure. The accompanying drawings are used to explain the principle of the present disclosure together with the description of the present disclosure provided above and a detailed description of embodiments provided below.

Characteristics of the present disclosure will become apparent from the following description of preferred forms of embodiments given as non-limiting examples with reference to the accompanying drawings.

Although the present disclosure is described with reference to some specific examples, those skilled in the art can implement many other equivalent forms of the present disclosure, which have features described in the claims and are therefore within the scope of protection.

When in connection with the accompanying drawings, aspects, features, and advantages of the present disclosure will become more apparent according to the following detailed description.

Specific embodiments of the present disclosure are described with reference to the accompanying drawings. However, described embodiments are only examples of the present disclosure, which can be implemented in various ways. Well-known and/or repeated functions and structures are not described in detail to avoid unnecessary or redundant details from obscuring the present disclosure. Therefore, specific structural and functional details in the specification are not intended to limit the present disclosure but are merely used as the basis and representative basis of the claims to teach those skilled in the art to use the present disclosure in a variety of ways with any suitable detailed structure.

The phrases "in an embodiment," "in another embodiment," "in yet another embodiment," or "in other embodiments" used in the specification each can refer to one or more of same or different embodiments according to the present disclosure.

A traffic import method of the existing MEC platform includes resolving a destination domain name into an address of a MEC platform gateway through domain name server (DNS) resolution and then sending a data message to the MEC platform through routing and forwarding of a core switch. Importing the traffic by DNS includes the following two major solutions.

The first solution includes adding record A corresponding to a domain name to a DNS of an operator core network and send the corresponding domain name to a DNS of the MEC platform. The DNS of the MEC platform resolves the corresponding domain name into an internal IP of the MEC platform. The traffics of the users finally reaches the MEC platform through routing and forwarding of the core switch. In this solution, each time a service requirement changes, maintenance needs to be performed on the DNS of the operator core network. When a business volume is too large, a load of the DNS is increased. A resolution speed of a first packet becomes slow, and the data processing efficiency is low.

The second solution includes directing all DNS traffics being directed to the MEC platform at an operator output gateway, resolving the DNS, and sending the domain name that the DNS server of the MEC platform cannot resolve back to the DNS server of the operator core network for performing resolution via normal Internet. However, this solution is equivalent to a DNS hijacking attack. The DNS with all the traffics pointing to the MEC platform is resolved first. The DNS resolved by the MEC platform cannot be audited in the operator's network. Normal DNS resolution needs to be routed to the MEC platform, which increases link time delay. Thus, the data processing efficiency is low.

Figure 1:
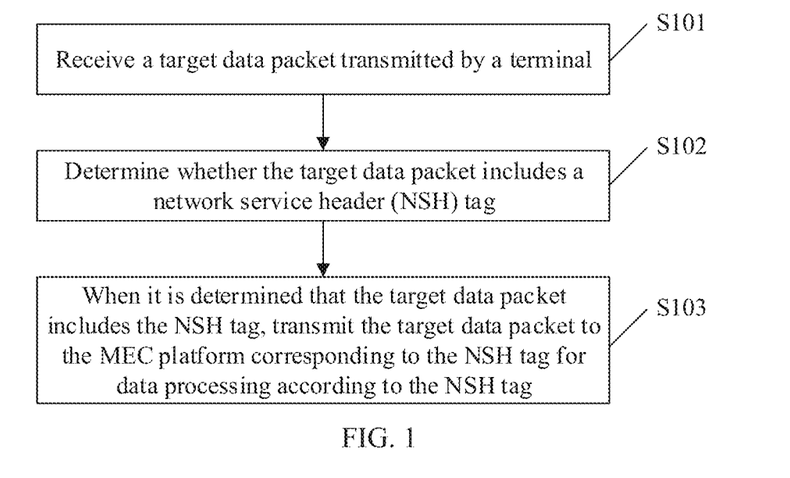
FIG. 1 illustrates a schematic flowchart of a data processing method based on a mobile edge computing (MEC) platform according to some embodiments of the present disclosure.

As shown in FIG. 1, embodiments of the present disclosure provide a data processing method based on a mobile edge computing (MEC) platform. The method may be applied at a gateway. The method includes the following steps.

At S101, a target data packet transmitted by a terminal is received.

In this step, the target data packet may include a data packet of a certain application server that the terminal needs to visit. Each MEC platform includes several application servers of a same application or several application servers of different applications.

At S102, whether the target data packet includes a network service header (NSH) tag is determined.

In this step, the NSH tag may be encapsulated into the target data packet by the terminal. Different MEC platforms may correspond to different NSH tags. By encapsulating the NSH tag, which MEC platform to perform data processing may be flexibly selected.

At S103, when it is determined that the target data packet includes the NSH tag, the target data packet is transmitted to the MEC platform corresponding to the NSH tag for data processing according to the NSH tag.

In embodiments of the present disclosure, each MEC platform may include various application servers. When a user wants to visit an application server, a data packet may be directly forwarded to the MEC platform where the application server is located according to the NSH tag encapsulated in the target data packet. Since a domain name may not need to be searched by a core network domain name resolution system, time of forwarding the data packet may be shortened, and data processing efficiency may be improved. In addition, since there is no need to transmit each data packet to the core network domain name system (DNS) for performing domain name search, a load of the core network DNS may be reduced. When different NSH tags are encapsulated in a plurality of data packets, the plurality of data packets may be forwarded to corresponding MEC platforms. Thus, a plurality of MEC platforms may be used to perform data processing simultaneously.

Figure 2:
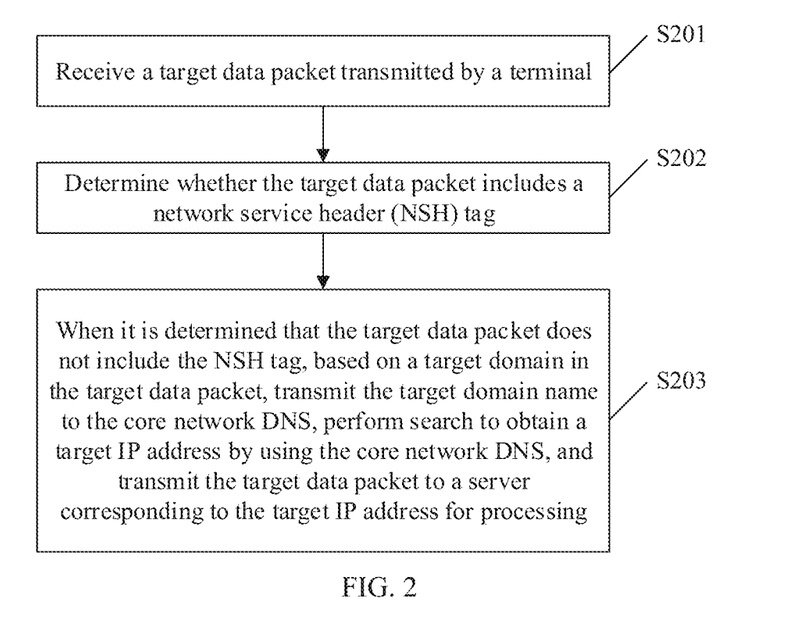
FIG. 2 illustrates a schematic flowchart of a data processing method based on a MEC platform according to some other embodiments of the present disclosure.

As shown in FIG. 2, embodiments of the present disclosure provide a data processing method based on the MEC platform. The method includes the following steps.

At S201, a target data packet transmitted by a terminal is received.

At S202, whether the target data packet includes an NSH tag is determined.

At S203, when it is determined that the target data packet does not include the NSH tag, based on a target domain in the target data packet, the target domain name is transmitted to the core network DNS. Search is performed to obtain a target IP address by using the core network DNS. The target data packet is transmitted to a server corresponding to the target IP address for processing.

In embodiments of the present disclosure, when the target data packet does not include the NSH tag is determined, the target data packet may be transmitted to the core network DNS to perform domain name resolution to obtain the target IP address by using the core network DNS. The target IP address obtained by resolution may be an IP address of a target MEC platform or an IP address of a target application server deployed by a MEC platform. After the target IP address is obtained, the target data packet may be transmitted to the application server corresponding to the target IP address for data processing.

Figure 3:
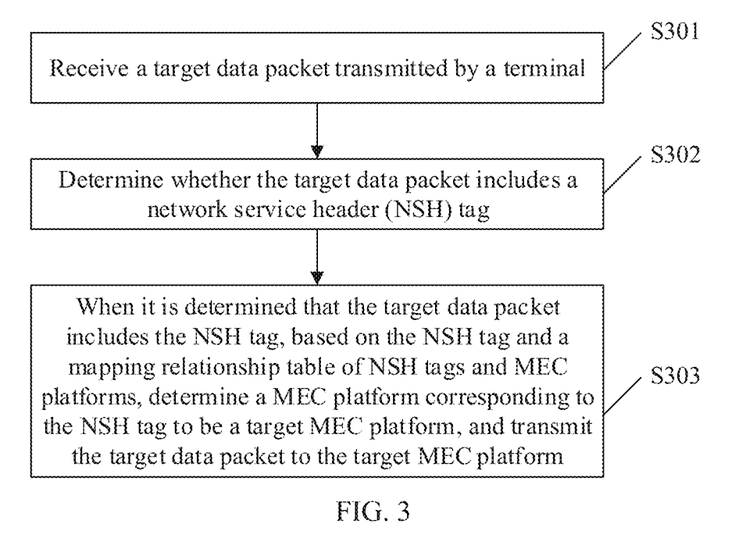
FIG. 3 illustrates a schematic flowchart of a data processing method based on a MEC platform according to some other embodiments of the present disclosure.

As shown in FIG. 3, embodiments of the present disclosure provide a data processing method based on the MEC platform. The method includes the following steps.

At S301, a target data packet transmitted by a terminal is received.

At S302, whether the target data packet includes an NSH tag is determined.

At S303, when it is determined that the target data packet includes the NSH tag, based on the NSH tag and a mapping relationship table of NSH tags and MEC platforms, a MEC platform corresponding to the NSH tag is determined to be a target MEC platform, and the target data packet is transmitted to the target MEC platform.

In some embodiments, the target MEC platform may be obtained by searching the mapping relationship table. As such, the target MEC platform may be determined faster and more accurately, which ensures to fast process the target data packet.

Further, the mapping relationship table of embodiments of the present disclosure may be pre-established. A process of establishing the mapping relationship table includes assigning the NSH tags to the MEC platforms and establishing the mapping relationship table to determine a mapping relationship between the NSH tags and the MEC platforms. Establishing the mapping relationship table may facilitate the search of the MEC platforms, which may build a basis for subsequently fast processing the target data packet.

Figure 4:
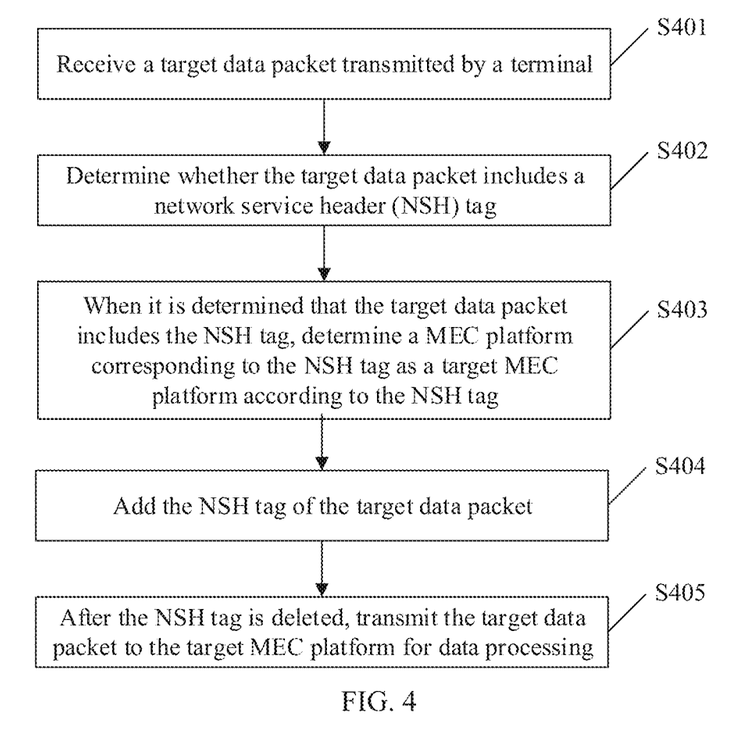
FIG. 4 illustrates a schematic flowchart of a data processing method based on a MEC platform according to some other embodiments of the present disclosure.

As shown in FIG. 4, embodiments of the present disclosure provide another data processing method based on the MEC platform. The method includes the following steps.

At S401, a target data packet transmitted by a terminal is received.

At S402, whether the target data packet includes an NSH tag is determined.

At S403, when it is determined that the target data packet includes the NSH tag, a MEC platform corresponding to the NSH tag is determined as a target MEC platform according to the NSH tag.

At S404, the NSH tag of the target data packet is deleted.

At S405, after the NSH tag is deleted, the target data packet is transmitted to the target MEC platform for data processing.

In embodiments of the present disclosure, after the target MEC platform is determined, the NSH tag in the target data packet may be deleted. Then, the target data packet may be transmitted to the target MEC platform. In some embodiments, the target data packet may be forwarded by using an NSH forwarding module to transmit the target data packet to the target MEC platform.

In some embodiments, each MEC platform may correspond to a DNS system. After the target data packet is forwarded to the target MEC platform, since each MEC platform includes a plurality of application servers, a domain name may be resolved to obtain an IP address of a target server by using the DNS system inside the MEC platform. The data packet may be transmitted to the target server based on the IP address for further data processing. In some other embodiments, the target data packet may be directly transmitted to the target server inside the corresponding MEC platform for processing.

Embodiments of the present disclosure provide a data processing method based on the MEC platform. The method includes the following steps.

A target data packet transmitted by a terminal is received.

Whether the target data packet includes an NSH tag is determined.

When it is determined that the target data packet includes the NSH tag, a processing priority of the target data packet is determined according to the NSH tag.

The target data packet is transmitted to the target MEC platform corresponding to the NSH tag for data processing according to the NSH tag and the processing priority of the target data packet.

In some embodiments, for example, when the same terminal initiates a plurality of visit requests, and a plurality of different application servers need to be visited, the gateway may receive several corresponding data packets. When the gateway receives the data packets, the processing priorities of the data packets may be determined according to whether the data packets include the NSH tags. For example, the data packets encapsulated with the NSH tags may be processed first. The data packets encapsulated without the NSH tags may be processed after the data packets encapsulated with the NSH tags are processed.

Embodiments of the present disclosure provide a data processing method based on the MEC platform. The method includes the following steps.

A target data packet transmitted by a terminal is received.

Whether the target data packet includes an NSH tag is determined.

A data type of the target data packet is determined.

A processing priority of the target data packet is determined according to the data type.

When it is determined that the target data packet includes the NSH tag, the target data packet is transmitted to the MEC platform corresponding to the NSH tag for data processing based on the processing priority of the target data packet and the NSH tag.

In some embodiments, for example, when the same terminal initiates a plurality of visit requests to visit a plurality of different application servers, the gateway may receive a plurality of corresponding data packets. When the gateway receives the plurality of data packets, whether the NSH tags are encapsulated in the plurality of data packets may be determined. When the NSH tags are determined to be encapsulated in the plurality of data packets, the data types of the data packets may be further determined. Then, the data packets with a specific data type may be forwarded first. The data type of the data packets without encapsulating the NSH tags may be determined. The data packets may be processed according to the processing priorities corresponding to the data types.

Figure 5:
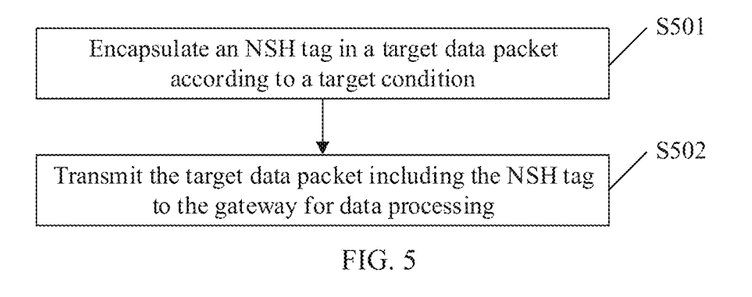
FIG. 5 illustrates a schematic flowchart of a data processing method based on a MEC platform according to some other embodiments of the present disclosure.

As shown in FIG. 5, embodiments of the present disclosure provide a data processing method, which can be applied to a terminal. The method includes the following steps.

At S501, an NSH tag is encapsulated in a target data packet according to a target condition.

The target condition of embodiments of the present disclosure may be set according to an actual situation. For example, the target condition may include a MEC platform that processes services less than a preset quantity and is deployed with an application server corresponding to the target data packet, or a MEC platform that is determined to process the target data packet.

At S502, the target data packet including the NSH tag is transmitted to the gateway for data processing.

In some embodiments, for example, when the user wants a certain MEC platform to process the data packet transmitted to the gateway by the terminal, the NSH tag corresponding to the MEC platform may be encapsulated in the target data packet. Then, the target data packet may be transmitted to the gateway. As such, after the gateway obtains the target data packet, the target MEC platform may be determined according to the NSH tag. Thus, the target data packet may be forwarded to the target MEC platform for processing, which improves the processing efficiency of the data packet.

In some embodiments, encapsulating the NSH tag for the target data packet according to the target condition includes obtaining a name of a to-be-visited application server in the target, determining the MEC platforms where the application server is located according to the name of the to-be-visited application server, and encapsulating an NSH tag corresponding to one of the MEC platforms into the target data packet according to the MEC platform where the application server is located. For example, the target condition may be a MEC platform that processes services less than the preset quantity. When the NSH tag is encapsulated, the name (xx server or yy server) of the application server corresponding to the target data packet may be determined first. The target data packet may need to be processed by the xx server (i.e., the target data packet corresponding to the xx server). Thus, MEC platforms that are deployed with the xx servers may need to be determined. Then, a MEC platform that processes the least services may be selected from the MEC platforms. The NSH tag of the MEC platform that processes the least services may be obtained. Finally, the NSH tag may be encapsulated into the target data packet.

Figure 6:
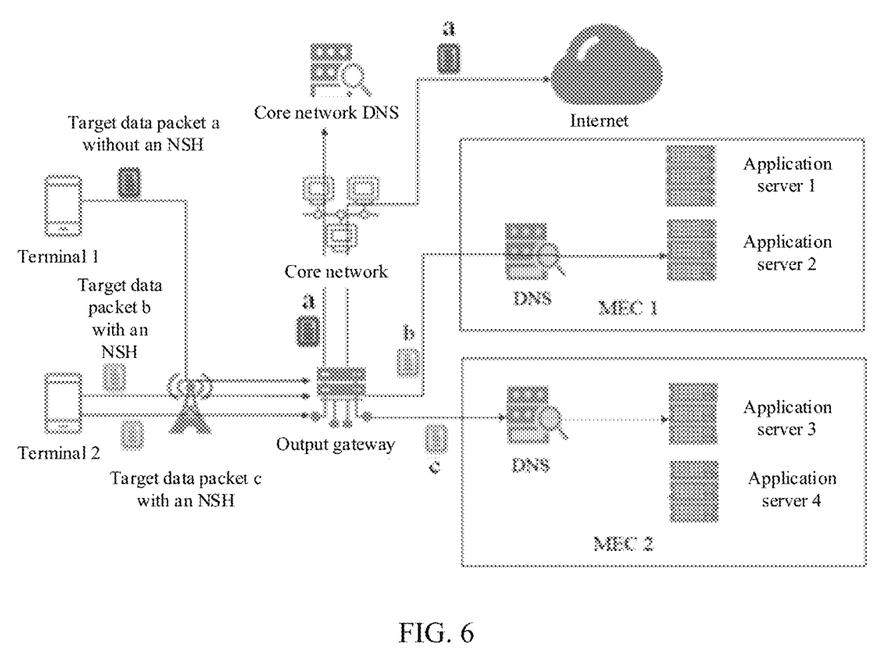
FIG. 6 illustrates a schematic architecture diagram of network deployment according to some embodiments of the present disclosure.

To further describe embodiments of the present disclosure, the following scenarios are combined for further description. FIG. 6 illustrates a schematic architecture diagram of network deployment according to some embodiments of the present disclosure. The network deployment includes an output gateway, and a MEC 1 platform and a MEC 2 platform communicated with the output gateway. The MEC 1 platform includes a DNS, an application server 1, and an application server 2. The MEC 2 platform includes a DNS, an application server 3, and an application server 4. The application server 1, the application server 2, the application server 3, and the application server 4 may include any number of same or different application servers. The application server 1 and the application server 3 may include same application servers, which are the xx application servers. The application server 2 may include the yy application servers. The application server 4 may include zz application servers. The data processing flow includes the following processes.

Terminal 1 wants to visit a ww application server. Since the MEC platforms do not include the ww application server, an NSH tag does not need to be encapsulated into a target data packet a. Even if the MEC platforms include the ww application server, since there is no visit condition/target condition, the NSH tag does not need to be encapsulated into the target data packet a. Then, terminal 1 transmits the target data packet a to the output gateway.

Terminal 2 wants to visit the yy application server (application server 2). A visit condition/target condition is an application server in the MEC platforms. Terminal 2 performs a search on the MEC platforms according to the name of the application server to determine that the MEC 1 platform includes the yy application server (application server 2). Thus, the NSH tag corresponding to the MEC 1 platform is encapsulated into a target data packet b. Then, the target data packet b is transmitted to the output gateway. Meanwhile, terminal 2 also wants to visit the xx application server. The target condition is being included in the MEC platforms. Thus, terminal 2 performs the search on the MEC platforms according to the name of the application server to determine that MEC 1 platform includes the xx application server (application server 1), and the MEC 2 platform includes the xx application server (application server 3). Then, service quantities are compared for the MEC 1 platform and the MEC 2 platform. The NSH tag corresponding to the MEC 2 platform that processes fewer services is encapsulated into a target data packet c. In some embodiments, an NSH tag corresponding to any one of the MEC platforms may be randomly encapsulated into the target data packet c. Encapsulating the NSH tag corresponding to the MEC 2 platform into the target data packet c is described as an example.

When the output gateway receives the target data packet a, the target data packet b, and the target data packet c, whether the target data packets include the NSH tag may be determined. When the target data packet a that does not include the NSH tag is determined, the target data packet a may be transmitted to the core network DNS. The target IP address may be obtained by using the core network DNS to perform domain name resolution. The target IP address may be transmitted to the target application server or a MEC platform that includes an application server through routing and forwarding of the core network. When it is determined that the target data packet b and the target data packet c include the NSH tags, the output gateway may process the target data packet b and the target data packet c first. The target data packet may be directly transmitted to the MEC 1 platform corresponding to the NSH tag in the target data packet b according to the NSH tag. The target data packet may be transmitted to the MEC 2 platform corresponding to the NSH tag in target data packet c according to the NSH tag. The target data packet may be directly transmitted to the target application server, or the domain name may be resolved by using the DNS inside the MEC platforms to obtain the target IP address. Then, the target data packet may be transmitted to the target application server according to the target IP address. That is, in some embodiments, the output gateway may forward the target data packet b to the application server 2 in the MEC 1 platform. After the output gateway transmits the target data packet c to the MEC 2 platform, the domain name may be resolved by using the DNS inside the MEC 2 platform. Then, the corresponding application server 3 may be determined. The target data packet c may be subsequently transmitted to the application server 3 for processing.

Figure 7:
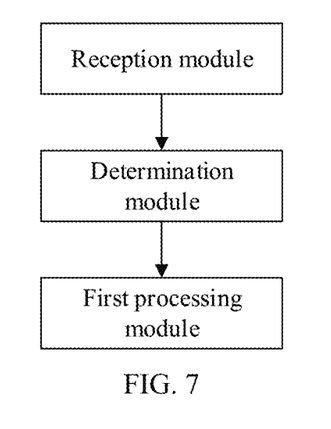
FIG. 7 illustrates a schematic flowchart of a data processing method based on a MEC platform according to some other embodiments of the present disclosure.

Embodiments of the present disclosure provide a data processing device based on the MEC platform. As shown in FIG. 7, the data processing device includes a reception modulemodule, a determination modulemodule, and a first processing module.

The reception module may be configured to receive a target data packet transmitted by a terminal.

The determination module may be configured to determine whether the target data packet includes a NSH tag.

The first processing module may be configured to, when it is determined that the target data packet includes the NSH tag, transmit the target data packet to a target MEC platform corresponding to the NSH tag for data processing according to the NSH tag.

In embodiments of the present disclosure, the determination module may be configured to determine whether the target data packet includes the NSH tag. According to the NSH tag, the target data packet may be firstly forwarded to the MEC platform corresponding to the NSH tag. As such, time of forwarding the data packet may be greatly reduced, and data processing efficiency may be improved.

In embodiments of the present disclosure, the data processing device further includes a second processing module. The second processing module may be configured to, when it is determined that the target data packet does not include the NSH tag, based on a target domain name in the target data packet, transmit the target domain name to a core network DNS. The second processing module may be further configured to perform a search to obtain a target IP address by using the core network DNS and transmit the target data packet to a server corresponding to the target IP address for processing.

In embodiments of the present disclosure, the first processing module may be configured to, based on the NSH tag and a mapping relationship table between NSH tags and MEC platforms, determine a MEC platform corresponding to the NSH tag as the target MEC platform and transmit the target data packet to the target MEC platform for processing.

The device further includes an establishment module, which may be configured to establish a correspondence between the NSH tag and the MEC platform. The establishment module may be configured to assign the NSH tags to the MEC platforms and establish a mapping relationship table to determine a mapping relationship between the NSH tags and the MEC platforms.

The device further includes a deletion module. The deletion module may be configured to delete the NSH tag of the target data packet. The deletion module may be further configured to transmit the target data packet after the NSH tag is deleted to the target MEC platform.

The device further includes a first priority determination module, which is configured to determine a processing priority of the target data packet according to the NSH tag. In some embodiments, the processing priorities of the data packets may be determined according to the NSH priorities. Thus, the data packets may be processed in sequence according to a predetermined sequence, such that the data packets may be processed more appropriately, and the data processing efficiency may be improved.

The device further includes a second priority determination module. The second priority determination module may be configured to determine a data type of the target data packet and determine the processing priority of the target data packet according to the data type. In some embodiments, the processing priorities of the data packets according to the data type may be determined. Thus, the data may be processed more appropriately, and the data processing efficiency may be improved.

Figure 8:
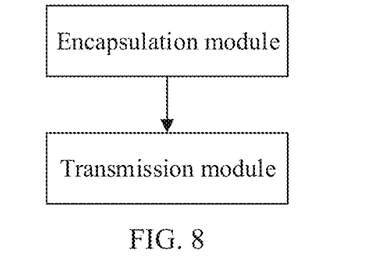
FIG. 8 illustrates a schematic structural block diagram of a data processing device according to some other embodiments of the present disclosure.

Embodiments of the present disclosure provide a data processing device. As shown in FIG. 8, the device includes an encapsulation module and a transmission module.

The encapsulation module may be configured to encapsulate an NSH tag for a target data packet according to a target condition.

The transmission module may be configured to transmit the target data packet that includes the NSH tag to a gateway for data processing.

In some embodiments, encapsulating the NSH tag for the target data packet may facilitate the target data packet to be directly transmitted to a corresponding MEC platform for processing. Thus, resources of MEC platforms may be flexibly selected according to NSH tags. That is, a user terminal may select an application server of the MEC platforms.

For example, when the user wants a certain MEC platform to process a data packet transmitted to the gateway by the terminal, the NSG tag corresponding to the MEC platform may be encapsulated into the target data packet. Then, the target data packet may be transmitted to the gateway. After the gateway obtains the target data packet, a target MEC platform may be determined according to the NSH tag. Then, the target data packet may be forwarded to the target MEC platform for processing to improve the data packet processing efficiency.

In some embodiments, the encapsulation module may be configured to obtain a name of a to-be-visited application server in the target and determine the MEC platforms where the application server is located according to the name of the to-be-visited application server. The encapsulation module may be further configured to, according to the MEC platforms where the application server is located, encapsulate an NSH tag corresponding to one of the MEC platforms into the target data packet. In some embodiments, by determining the name of the to-be-visited application server, all the MEC platforms that include the application server may be determined. Thus, the NSH tag of the one of the MEC platforms may be selected as the target NSH tag according to the target condition. The NSH tag may be then encapsulated into the target data packet to provide a basis for the MEC platform to quickly process a data packet.

Embodiments of the present disclosure provide a storage medium. The storage medium may include a computer-readable medium. The storage medium may store a computer program that, when executed by a processor, causes the processor to realize the following steps.

Step 1, a target data packet transmitted by a terminal is received.

In this process, the target data packet may be a data packet of an application server that the terminal needs to visit. Each MEC platform may include several application servers for a same application or several application servers for different applications.

Step 2, whether the target data packet includes an NSH tag is determined.

In this step, the NSH tag may be encapsulated into the target data packet by the terminal. Different NSH tags may correspond to different MEC platforms. MEC platforms may be flexibly selected for data processing by encapsulation of the NSH tag.

Step 3, when it is determined that the target data packet includes the NSH tag, according to the NSH tag, the target data packet is transmitted to a target MEC platform corresponding to the NSH tag for data processing.

In some embodiments, the storage medium may realize processes of the data processing method based on the MEC platform of any one of above embodiments, which is not repeated here.

In some embodiments, each MEC platform may include various application servers. When the user wants to visit a certain application server, the user may directly forward the data to the MEC platform where the application server is located according to the NSH tag encapsulated in the target data packet. Since a domain name does not need to be searched through the core network domain name resolution system, the time for forwarding the data packet may be reduced, and the data processing efficiency may be improved.

Embodiments of the present disclosure provide a storage medium. The storage medium may be a computer-readable medium. The storage medium stores a computer program that, when executed by a processor, causes the processor to realize the following processes.

Process 1, an NSH tag is encapsulated for a target data packet according to a target condition.

Process 2, the target data packet including the NSH tag is transmitted to a gateway for data processing.

In some embodiments, the storage medium may realize the processes of the data processing method of any of above embodiments, which is not repeated here.

In some embodiments, for example, when the user wants a certain MEC platform to process a data packet transmitted to the gateway by the terminal, the NSH tag corresponding to the MEC platform may be encapsulated into the target data packet. Then, the target data packet may be transmitted to the gateway. Thus, after the gateway obtains the target data packet, a target MEC platform may be determined according to the NSH tag. The target data packet may be forwarded to the target MEC platform for processing to improve the data processing efficiency.

In embodiments of the present disclosure, a functional unit or a functional module refers to one or more computer programs that are stored in computer readable medium. When executed by one or more processors, the computer programs may implement the functions of the corresponding functional module or functional unit. In some embodiments, a functional unit or a functional module may be implemented as a combination of software and hardware components. The software and hardware components may execute certain computer programs to implement the functions of the corresponding functional module or functional unit.

Above embodiments are only exemplary embodiments of the present disclosure and are not used to limit the present disclosure. The scope of the present invention is defined by the claims. Those skilled in the art may make various modifications or equivalent substitutions to the present disclosure within the essence and scope of the present disclosure. Such modifications or equivalent substitutions are within the scope of the present disclosure.

What is claimed is:

1. A data processing method based on a mobile edge computing (MEC) platform, comprising:
   receiving, by a gateway, a target data packet transmitted by a terminal;
   determining, by the gateway, whether the target data packet includes a network service header (NSH) tag, the NSH tag corresponding to a unique MEC platform; and
   in response to determining that the target data packet includes the NSH tag, transmitting, by the gateway, the target data packet to the unique MEC platform corresponding to the NSH tag for data processing, the unique MEC platform including a plurality of application servers of a same application or a plurality of application servers of different applications.

2. The method of claim 1, further comprising, in response to determining that the target data packet does not include the NSH tag:
   based on a target domain name in the target data packet, transmitting the target domain name to a core network domain name system;
   performing a search to obtain a target IP address using the core network domain name system; and
   transmitting the target data packet to a server corresponding to the target IP address for processing.

3. The method of claim 1, wherein according to the NSH tag, transmitting the target data packet to the unique MEC platform corresponding to the NSH tag includes:
   based the NSH tag and a mapping relationship table between NSH tags and MEC platforms, determining a MEC platform corresponding to the NSH tag as the unique MEC platform; and
   transmitting the target data packet to the unique MEC platform.

4. The method of claim 3, further comprising establishing a correspondence between the NSH tags and the MEC platforms, including:
   assigning the NSH tags to the MEC platforms; and
   building the mapping relationship table to determine mapping relationships between the NSH tags and the MEC platforms.

5. The method of claim 3, further comprising:
   deleting the NSH tag of the target data packet; and
   transmitting the target data packet after the NSH tag is deleted to the unique MEC platform.

6. The method of claim 1, further comprising:
   determining a processing priority of the target data packet according to the NSH tag.

7. The method of claim 1, further comprising:
   determining a data type of the target data packet; and
   determining a processing priority of the target data packet according to the data type.

8. A data processing method, comprising:
   encapsulating a network service header (NSH) tag for a target data packet according to a target condition, the NSH tag corresponding to a unique mobile edge computing (MEC) platform; and
   transmitting the target data packet having the NSH tag to a gateway for the gateway to transmit the target data packet to the unique MEC platform corresponding to the NSH tag for data processing, the unique MEC platform including a plurality of application servers of a same application or a plurality of application servers of different applications.

9. The method of claim 8, wherein encapsulating the NSH tag for the target data packet according to the target condition includes:
   obtaining a name of a to-be-visited application server in a target;
   determining MEC platforms where the to-be-visited application server is located according to the name of the to-be-visited application server; and
   encapsulating the NSH tag corresponding to the unique MEC platform of the MEC platforms into the target data packet according to the MEC platforms where the application server is located.

10. A non-transitory storage medium, comprising:
    a computer program that, when executed by a processor, causes the processor to:
    receive a target data packet transmitted by a terminal;
    determine whether the target data packet includes a network service header (NSH) tag, the NSH tag corresponding to a unique MEC platform; and
    in response to determining that the target data packet includes the NSH tag, transmit the target data packet to the unique MEC platform corresponding to the NSH tag for data processing, the unique MEC platform including a plurality of application servers of a same application or a plurality of application servers of different applications.

11. The non-transitory storage medium of claim 10, wherein the processor is further caused to, in response to determining that the target data packet does not include the NSH tag:
    based on a target domain name in the target data packet, transmit the target domain name to a core network domain name system;
    perform a search to obtain a target IP address using the core network domain name system; and
    transmit the target data packet to a server corresponding to the target IP address for processing.

12. The non-transitory storage medium of claim 10, wherein
    the processor is further caused to:
    based the NSH tag and a mapping relationship table between NSH tags and MEC platforms, determine a MEC platform corresponding to the NSH tag as the unique MEC platform; and
    transmit the target data packet to the unique MEC platform.

13. The non-transitory storage medium claim 12, wherein the processor is further caused to:
    establish a correspondence between the NSH tags and the MEC platforms by:
    assigning the NSH tags to the MEC platforms; and
    building the mapping relationship table to determine mapping relationship between the NSH tags and the MEC platforms.

14. The non-transitory storage medium of claim 12, wherein
    the processor is further caused to:
    delete the NSH tag of the target data packet; and
    transmit the target data packet after the NSH tag is deleted to the unique MEC platform.

15. The non-transitory storage medium of claim 10, wherein the processor is further caused to:
    determine a processing priority of the target data packet according to the NSH tag.

16. The non-transitory storage medium of claim 10, wherein the processor is further caused to:
   determine a data type of the target data packet; and
   determine a processing priority of the target data packet according to the data type.

17. The non-transitory storage medium of claim 10, wherein the processor is further caused to:
   encapsulate the NSH tag for the target data packet according to a target condition; and
   transmit the target data packet having the NSH tag to a gateway for the gateway to transmit the target data packet to the unique MEC platform corresponding to the NSH tag for data processing.

18. The non-transitory storage medium of claim 17, wherein the processor is further caused to:
   obtain a name of a to-be-visited application server in a target;
   determine MEC platforms where the to-be-visited application server is located according to the name of the to-be-visited application server; and
   encapsulate the NSH tag corresponding to the unique MEC platform of the MEC platforms into the target data packet according to the MEC platforms where the application server is located.

* * * * *